US006744780B1

United States Patent
Gu et al.

(10) Patent No.: US 6,744,780 B1
(45) Date of Patent: Jun. 1, 2004

(54) METHOD AND SYSTEM FOR ADAPTIVELY MANAGING A COMMUNICATIONS NETWORK

(75) Inventors: Zhichong Gu, Reynoldsburg, OH (US); Richard A. Johnston, Columbus, OH (US); Ashish Sumant, Columbus, OH (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/428,047

(22) Filed: Oct. 27, 1999

(51) Int. Cl.[7] ............................................... H04L 12/26
(52) U.S. Cl. ....................................... 370/450; 370/346
(58) Field of Search ................................ 370/449, 85.8, 370/95.2, 230–234, 346, 450, 453, 454–457; 710/220; 379/92.01–93.08

(56) References Cited

U.S. PATENT DOCUMENTS

| | | | | |
|---|---|---|---|---|
| 3,742,452 A | * | 6/1973 | Audretsch, Jr. et al. | |
| 4,829,297 A | * | 5/1989 | Ilg et al. | |
| 5,295,244 A | * | 3/1994 | Dev et al. | |
| 5,818,845 A | * | 10/1998 | Moura et al. | |
| 6,246,693 B1 | * | 6/2001 | Davidson et al. | |
| 6,453,268 B1 | * | 9/2002 | Carney et al. | |
| 6,615,161 B1 | * | 9/2003 | Carney et al. | ............... 702/186 |

\* cited by examiner

Primary Examiner—Chi Pham
Assistant Examiner—Thai D Hoang

(57) ABSTRACT

A system and method for managing a communications network establishes an initial polling interval for a corresponding network element. The network management system detects whether the network element provides at least one status message during a group of sequential polls. Each poll within the group is preferably separated by the initial polling interval. The network management system adjusts the initial polling interval to a subsequent polling interval for the network element based on the detection of the status message to adaptively meet the communications traffic requirements.

16 Claims, 6 Drawing Sheets

METHOD AND SYSTEM FOR ADAPTIVELY MANAGING A COMMUNICATIONS NETWORK

FIELD OF THE INVENTION

The present invention relates to a management system and method for adaptively managing a communications network.

BACKGROUND

A communications network management system may be used to monitor the status of network elements in a communications network. Some communications network management systems allow an operator to control the status of certain network elements in the communications network to respond to alarms or to manage the functionality of network elements. A communications network management system may communicate with network elements on a polled basis to save telecommunications charges or to reduce the requisite channel capacity between the network elements and the network management system.

The network elements may be polled at successive fixed intervals. The fixed interval allotted to each network element may not provide sufficient transmission throughput to adequately monitor the real-time status of network elements if one or more network elements produce an overload of status messages or a high alarm volume. Thus, a need exists for improving the response time for the transmission of status messages or alarms from the network elements to the network management system.

The alarm traffic from the network elements may not be sufficient over certain periods of time to justify the channel capacity allocated between the network management system and the network elements. For example, the channel capacity for polling communications may be geared to satisfy a maximum anticipated traffic level from the network elements, that substantially exceeds an average actual traffic level from the network elements. During times in when no information is sent from a network element to the network management system or vice versa, an established idle communications channel between the network element and the network management system represents an undesired cost. Accordingly, a service provider may end up paying for communication costs commensurate with the maximum channel capacity used, instead of some actual lower channel capacity, which would suffice. Thus, the need exists for providing channel capacity over a polling system that is commensurate with the traffic activity produced by the network elements.

SUMMARY OF THE INVENTION

In accordance with a preferred embodiment, a method and system for managing a communications network provides a dynamically adaptive polling interval that is commensurate with the traffic (e.g., status messages) generated by remote network elements in communication with a network management system. The network management system establishes an initial polling interval for a corresponding network element. The network management system detects whether the network element provides at least one status message during a group of sequential polls. Each poll within the group is preferably separated by the initial polling interval. The network management system adjusts the initial polling interval to a subsequent polling interval for the network element based on the detection of one or more status messages to adaptively meet the communications traffic requirements.

DETAILED DESCRIPTION OF PREFERRED EMBODIMENTS

Figure 1:
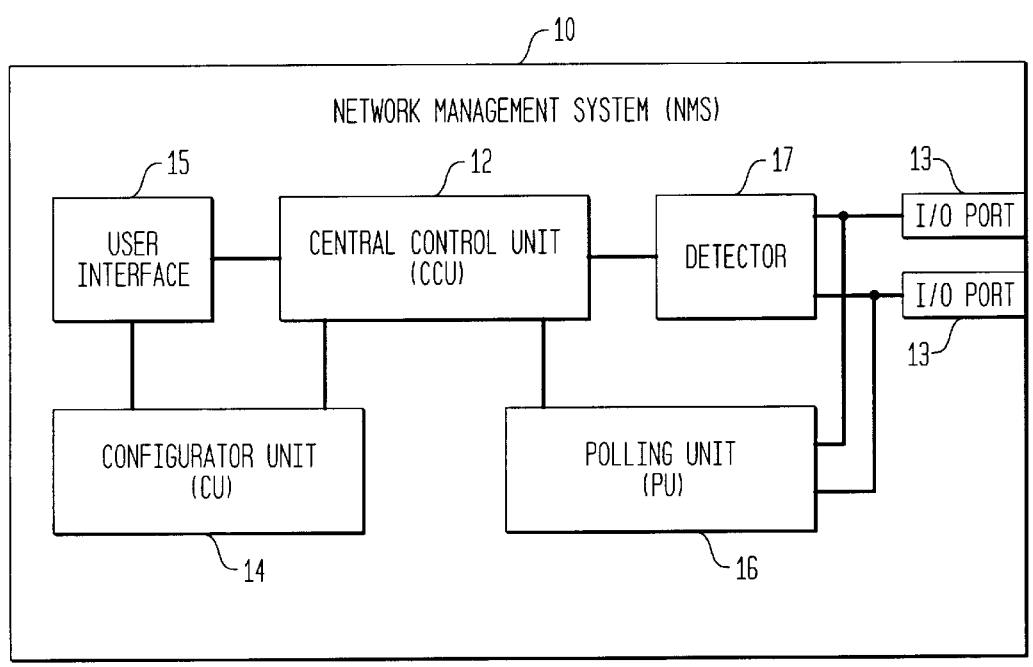
FIG. 1 is a block diagram of a network management system in accordance with the invention.
Figure 2:
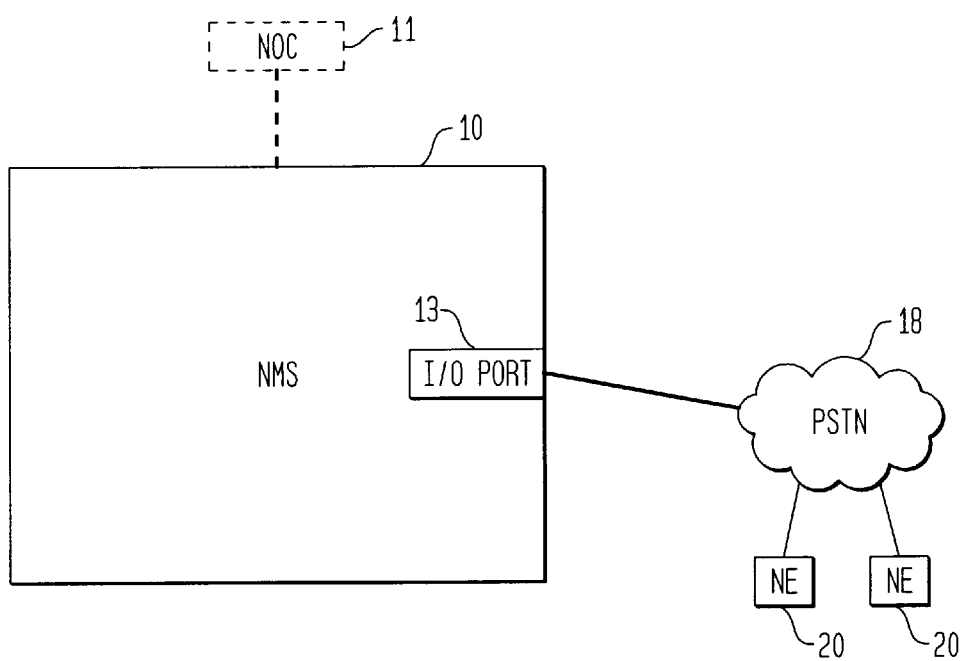
FIG. 2 is a block diagram of a network management system operating through a public switched telephone network in accordance with the invention.

FIG. 1 shows a block diagram of a network management system 10. FIG. 2 shows the network management system 10 (NMS) of FIG. 1 communicating with one or more network elements (NE) 20. The network management system 10 includes a central control unit (CCU) 12, a configurator unit (CU) 14, a polling unit (PU) 16, a user interface 15, input/output ports 13, and a status message detector 17. The user interface 14, such as a graphical user interface or any other suitable interface, is coupled to the configurator unit 14 and the central control unit 12. The central control unit 12 is further adapted to communicate with at least the configurator unit 14, the detector 17, and the polling unit 16. The input/output ports 13 are coupled to at least one detector 17 and the polling unit 16.

The user interface 15 accepts user input from an operator or technician to configure communications links between the network management system 10 and one or more network elements 20. The configurator unit 14 maintains and stores configuration data on communications parameters for communicating between the network management system 10 and network elements 20 based on the user input. For example, the configurator unit 14 may store configuration data on the input/output ports 13 for operation in a dedicated mode or in a polling mode. In the polling mode, an input/output port 13 services a group of network elements 20 on a polling basis, whereas in the dedicated mode the input/output port 13 services one network element 20 on a full-time basis.

The configurator unit 14 reads the input for a currently entered or later configuration and compares the later configuration to an earlier configuration stored in the configurator unit 14. If certain links are the same for the later configuration and the earlier configuration, the common links are maintained. If certain links are different for the later configuration and the earlier configuration, new links are established, the old links are torn down, or both to achieve the later configuration.

The central control unit 12 determines when any changes in the configuration data should take effect based on data from the detector 17, the state of the polling unit 16, or both such that changes in configuration are transparent, as opposed to disruptive to communications between the network management system 10 and the network elements 20. The central control unit 12 allows an input/output port 13 to be reconfigured from the polling mode to the dedicated mode, or vice versa, in a dynamic manner without shutting down the network management system 10 or disrupting the monitoring of status messages of the network elements 20. Accordingly, the central control unit 12 may wait to honor a change in the configuration data until the network element 20 is not actively transmitting a data message to the network management system 10.

The polling unit 16 polls the network elements 20 at an initial polling interval in accordance with the configuration data under the direction of the central control unit 12. The central control unit 12 may establish an initial polling interval for each corresponding network element 20. The polling interval refers to a time lapse between an earlier poll of a particular network element 20 and the next later poll of the particular network element 20. The polling unit 16, the central control unit 12, or both may adjust or scale the polling interval for each network element 20 between a maximum polling interval and a minimum polling interval defined in the configuration data.

In general, the detector 17 detects whether the network element 20 provides at least one status message during a group of sequential polls. During the detection procedure, each poll within the group is seperated by the initial polling interval. The polling unit 16 may adjust the initial polling interval to a subsequent polling interval based on the detection of one or more status messages in the group. In one example, the detector 17 provides detection data as the total number of status messages detected per a group of successive polls of a network element 20 to determine any appropriate adjustment of the pooling interval from an initial polling interval to a subsequent polling interval. The total number of detected status messages per the total number of polls may be expressed as a ratio. If the ratio equals one or approximately equals one, traffic from the network element 20 is regarded as continuously present.

The central control unit 12 supervises the accumulation of status messages or alarms from the network elements 20 via the polling unit 16. The accumulated messages are stored as a batch until message generation or presentation to an operator over the user interface 15 is appropriate. The central control unit 12 determines when message generation is appropriate to provide status messages to an operator of the network management system 10.

In one embodiment, each network element 20 may be associated with a corresponding unique polling interval based on traffic detected by the detector 17 from the network element 20. The polling unit 16, the central control unit 12, or both preferably adjusts the polling interval according to the extent of status information sent from a network element 20 to the network management system 10 in response to a recent poll or a group of recent polls. For example, if a network element 20 fails to send a fault message during an initial polling interval or an initial group of polling intervals, the polling unit 16 increases the initial polling interval to a subsequent polling interval in accordance with a logarithmic scale or otherwise. Further, the polling interval may be changed dynamically or on-the-fly without disrupting communications between the network elements 20 and the network management system 10.

FIG. 2 provides a block diagram of a network management system 10 operating through a public switched telephone network (PSTN) 18 to communicate with a plurality of network elements 20. Like reference numbers in FIG. 1 and FIG. 2 indicate like elements.

The public switched telephone network 18 may provide dedicated lines, integrated services digital network (ISDN) lines, digital subscriber loop lines (DSL), high bit rate digital subscriber lines (HDSL), or analog dial-up lines for communication between the network management system 10 and the network elements 20. Although operation over a public switched telephone network 18 is shown, in an alternate embodiment the network management system 10 may operate over a packet network, instead of the public switched telephone network 18.

The network management system 10 receives alarms from different network elements 20 via the public switched telephone network 18, or otherwise, and keeps the received alarms in one or more queues. In one embodiment, each queue has inter-queue priority based on a classification of the importance of an message. Further, within each queue, the priority of the status messages may be organized or ranked in accordance with a first-in, first-out priority scheme. In one example, the queues include a critical alarm queue, a major alarm queue, a minor alarm queue, a warning queue and an informational queue. The above queues are listed in order of descending priority.

In accordance with a first example, the foregoing queues are accessible to the user interface 15 for display to an operator of the network management system 10. In accordance with a second example, the foregoing queues are accessible to an optional network operation center (NOC) connected to the network management system 10, as indicated by the dashed lines in FIG. 2. The network operation center represents another tier of a network management system 10 that may display inputs and provide an interface to multiple network management systems 10.

Figure 3:
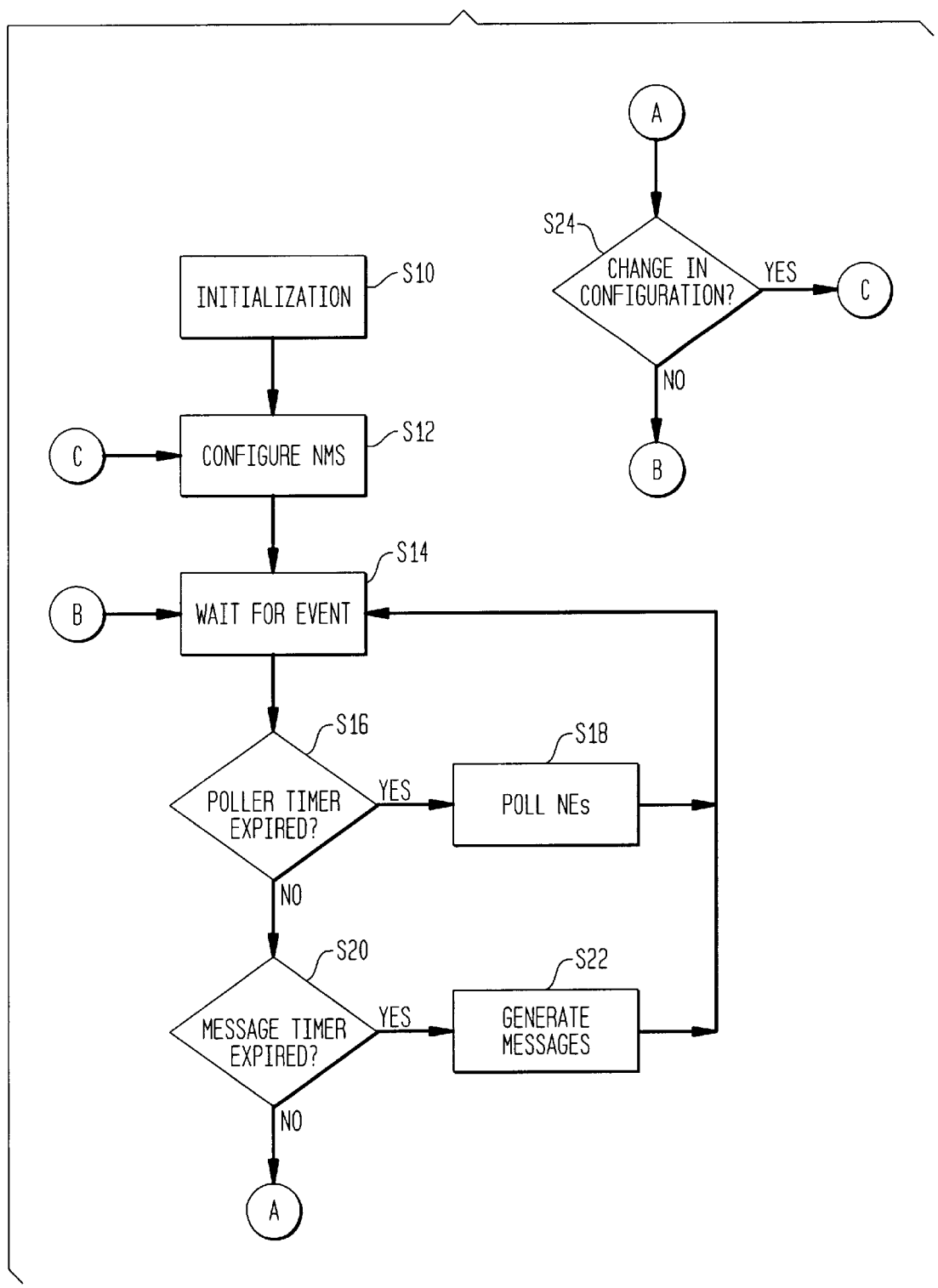
FIG. 3 is flow diagram illustrating operation of a central control unit of FIG. 1 in accordance with the invention.

FIG. 3 is a flow chart illustrating the operation of the central control unit 12 logic of the network management system 10. Beginning in step S10, the central control unit 12 initializes values of poller timers, a message timer, a configuration change sensor, or other event-related values managed by the central control unit 12 logic.

After step S10 in step S12, the network management system 10 is configured for communication with one or more network elements 20. A user of the network management system 10 may enter configuration data into the user interface 15 for configuring the network management system 10. For example, the user may supply a desired configuration of the network management system 10 in a configuration file supplied as an input to the user interface 15.

The configuration data sets various communication parameters of the network management system 10 for communications with the network elements 20. Communication parameters include configuration of input/output ports associated with the network management system 10 as polled ports or dedicated ports. The network management system 10 has a maximum number of physical input/output ports that may impact the allocation between dedicated ports and polled ports. In most cases, at least one of the physical ports is reserved for polling only operation.

The decision of whether to configure the network management system 10 with dedicated versus polled ports depends upon technical considerations as well as economic considerations. If the decision were based primarily on reducing costs of communications over the public switched telephone network 18, as many lines as possible might be configured as polled connections for communication over the public switched telephone network 18. However, communication costs of the public switched telephone network 18 could be reduced by using dedicated lines over customer-owned microwave links, or fiber optic links, for example.

With respect to technical considerations, one or more network elements 20 may require a dedicated line for certain diagnosis of technical problems or to send larger amounts of data to the network management system 10 than would otherwise be possible over a polled port.

Configuring the network management system 10 involves the management of various logical layers that cooperate with a physical layer. The physical layer preferably supports the transmission of data packets between the input/output ports 13 and the network elements 20. The input/output ports 13 may comprise asynchronous ports. The logical layers may use TCP protocol (transmission control protocol) at the link protocol layer and IP (internet protocol) at the network layer level to communicate data between the network elements 20 and the network management system 10.

For example, to setup a link, the central control unit 12 retrieves an IP address for a network element 20 from configuration data provided at the user interface 15. The central control unit 12 causes input/output functions to add a route to a TCP/IP routing table, which may be stored as a look-up table in a database associated with the central control unit 12. The TCP/IP routing table may contain a dial-up script for reference to manage a communications input/output port setup routine. The central control unit 12 preferably executes the routing setup during the run time of the network management system 10. After the link is established the operator can preferably access the remote network element 20 through a communications program (e.g., telenet communications program).

In step S14 after step S12, the central control unit 12 waits for an event, such as the expiration of a poller timer in step SI6, the expiration of a message timer in step S20, or a detection of a change in configuration in step S24. Accordingly, step S14 entails a stand-by mode in which the central control unit 12 regularly or periodically monitors the occurrence of new events defined in steps S16, S20, and S24.

In step S16, the central control unit 12 determines if a poller timer has expired. In one configuration, each network element 20 preferably is associated with a corresponding poller timer. However, in an alternate configuration each network element 20 that is a member of a polling group has a common poller timer. Thus, all members of the polling group may share a common polling interval.

Each network element 20 is characterized by two fundamental attributes: (1) polling interval and (2) connection type. The polling interval refers to how much time lapses between polling for status messages. The connection type refers to whether the link to the network element 20 is dedicated or polled.

The poller timer starts upon or after initial setup of a link between the network management system 10 and a network element 20. The poller timer allocates a communication duration for communication between the polling unit 16 and the network element 20 based on the polling interval applied to a network element 20. The polling interval may have a lower limit or an upper limit based on limitations of the communications network for setup and tear-down of communications between the network element 20 and the network management system 10.

For a dedicated link, if the poller timer expires, the timer is just reset or ignored without tearing down the link. However, for a polled link, if the poller timer expires, the timer is reset and the link is torn down. At each polling interval a call is established and torn-down because the line over the public switched telephone network 18 may be metered or billed by seconds or minutes of usage. Thus, the less the line is used, the greater the economic savings for line usage, or the lesser the need for higher capacity of point-to-point communications system.

Upon expiration of the poller timer in step S16, the link between the network management system 10 and the network element 20 is torn down in step S18 to prepare for polling the next network element 20 on a polling list. In step S18, a next link is setup between a next network element 20 and a network management system 10 after tearing down the previous link. Upon polling the next network element 20, the central control unit 12 waits for the occurrence of the next event. The next event to occur may be the another expiration of the poll timer, an expiration of a message timer, or a change in configuration.

In step S20, if a message timer expires, the messages will be generated in step S22 for display to a user on a user interface 15 or outputted in another form. The message timer may start when a first status message is received from a network element 20. In a preferred configuration, the message timer may expire based on the network management system 10 detecting a certain time duration after receipt of a status message from a network element 20. In an alternate configuration, the message timer may expire based on the network management system 10 receiving and detecting a certain threshold number of messages. Thus, in either configuration, the message timer generally has the function of accumulating messages prior to outputting the messages to a user. The accumulated messages are displayed or presented in a batch to an operator.

The duration of the message timer may differ by queue such that the transmission rate from the highest priority queue has a higher frequency than the transmission rate from the lower queue. However, the message timer may not differ among the different queues, where the highest priority transmits queue contents as a larger data block or group of data blocks than the lowest priority queue.

In step S22, the generated status messages may be in a suitable format for display over a graphical user interface 15 or may be in suitable form for transmission. In practice, the generated status messages from the queue may be generated as a text bit stream, which may be observed for example with a ROP (read-only printer) associated with the network management system 10. The text bit stream may be compatible with text bit streams that are transmitted from network elements 20 of a wireless communications system.

In step S22, the status messages may stored in a memory accessible to a network operations center interface 11. The generation of the messages in step S22 is used to regularly or periodically drain the contents of various queues.

After the messages are generated in step S22, the method continues with step S14 in which the central control unit 12 waits for the occurrence of the next event. For example, the next occurring event may be a change in configuration.

A user may enter a change in configuration from the user interface 15 or such changes may be preprogrammed into a configuration file resident in the network management system 10. The configuration file specifies the communications parameters for communicating to the remote network elements 20. For example, the communication parameters define the network elements 20 by an identifier name, a phone number, and a connection type (e.g., dedicated, polled, digital, analog, or the like).

According to a first technique, the configuration information is saved in a configuration file. The configuration file may be accessed upon the network management system 10 detecting the occurrence of a particular event or set of conditions (e.g., disaster recover plan). For example, the network management system 10 may detect changes in the configuration file itself as the occurrence of a particular event.

As an alternative to the configuration file, the interconnection specifications could be obtained through an interactive interface, such as a command line or a graphical user interface 15.

A change in configuration data may include a change in the identity of network elements 20 on a polling list, the link type associated with a particular network element 20, or the like. The central control unit 12 accommodates a change, growth, or reduction in the number of monitored or controlled network elements 20. If a change in configuration is present, the method continues with step S12, in which the network management system 10 is reconfigured or updated according to any new settings associated with the change in configuration.

Figure 4:
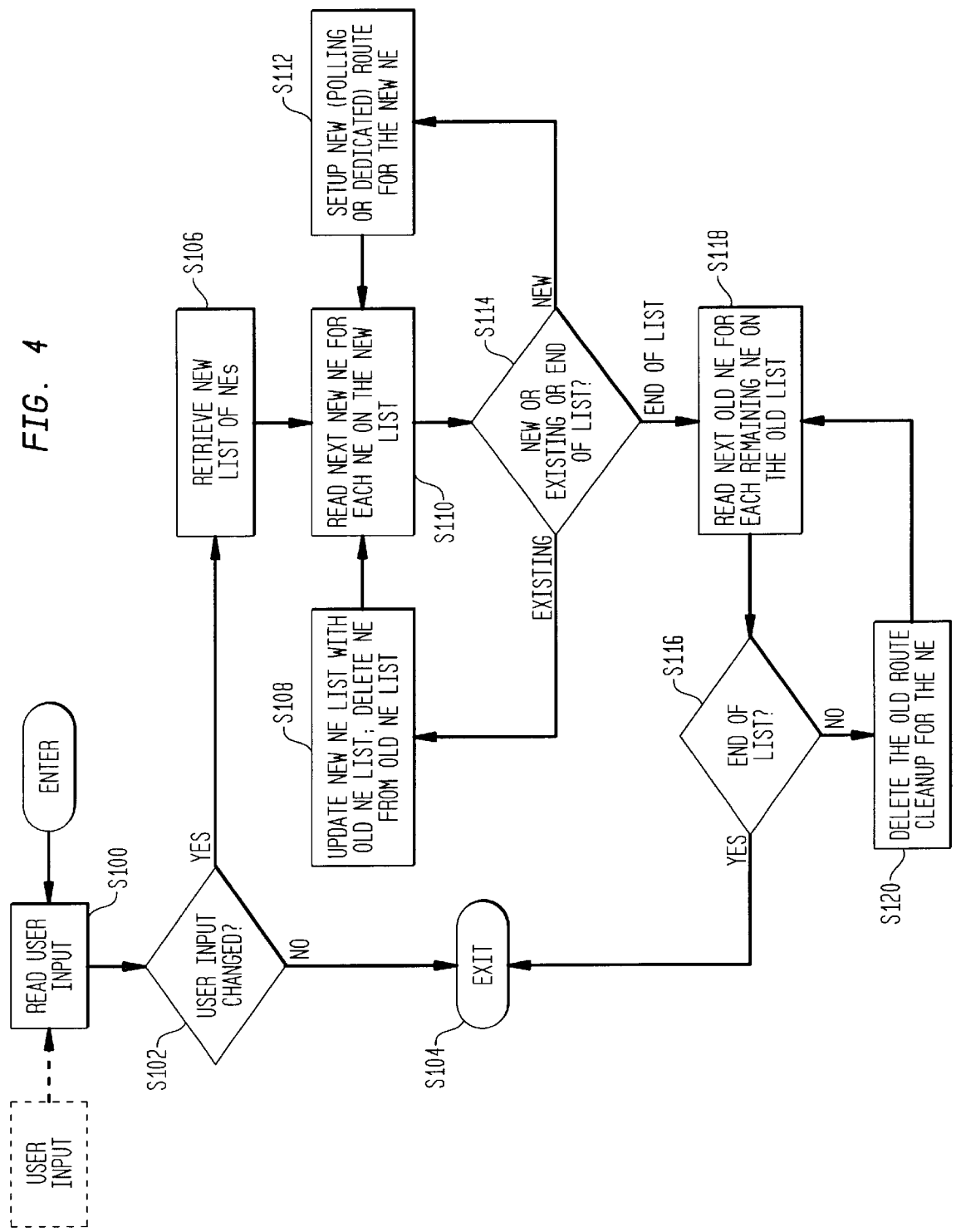
FIG. 4 a flow diagram illustrating operation of a configurator unit of FIG. 1 in accordance with the invention.

The configurator unit 14 logic is shown in FIG. 4. Starting in step S100, the configurator unit 14 logic reads user input entered into the user interface 15.

In step S102, the configurator unit 14 logic determines if the user input requires a change in configuration data associated with communications with the active network elements 20. If the configuration data has not changed, the dynamic configuration process ends at step S104 or at least waits until any new user input is obtained that changes the configuration data.

If the configuration data has changed in step S102, the method continues with step S106, in which the configurator unit 14 retrieves a new list of network elements 20.

After step S106 in step S110, the configurator unit 14 reads a next network element 20 on the new list of network elements 20.

The method continues in step S114, in which it determines if the read network element 20 most recently read in step S110 satisfies one of the following states: (1) a new network element 20 not on the old network element list, (2) an existing network element 20 on the old network element list, or (3) the end of the new network elements 20 on the new list has been reached. If the read network element 20 is existing or old, the method continues with step S108. If the read network element 20 is new, the method continues with step S112. If the read network element 20 is at the end of the list, the method continues with step S118.

In step S108, the configurator unit 14 updates the new network element list with a route (e.g., polled or dedicated) from an old network element list for the read network element 20. Further, the configurator unit 14 deletes a particular network element 20 from the old network element list once the route is added to the new network element list. After step S108, the method continues with step S110 to read the next network element 20 on the new list.

In step S112, the configurator unit 14 sets up a new route (polled or dedicated) for the newly read network element 20. Accordingly, the new route is added to the new network element list. Then, after step S112, the method continues with step S10.

In step S118, the configurator unit 14 reads the next network element 20 from a list for at least one of the remaining network element 20 on the old network element list.

In step S116, after step S118, the configurator determines whether the end of the old list has been reached based on the iterative or noniterative results of the reading in step S10 and deletion from the old network element list in step S108, for example. If the end of the old list of old network elements 20 is not reached, the configurator deletes the old route of the most recently read old network element 20 on the old network element list to cleanup the data in the network management system 10 associated with the network element 20. The data is cleaned up because the data is no longer needed and may use desired storage space of the network management system 10. If the end of the old list has been reached as determined in step S1 16, the method ends at step S1 04.

Figure 5:
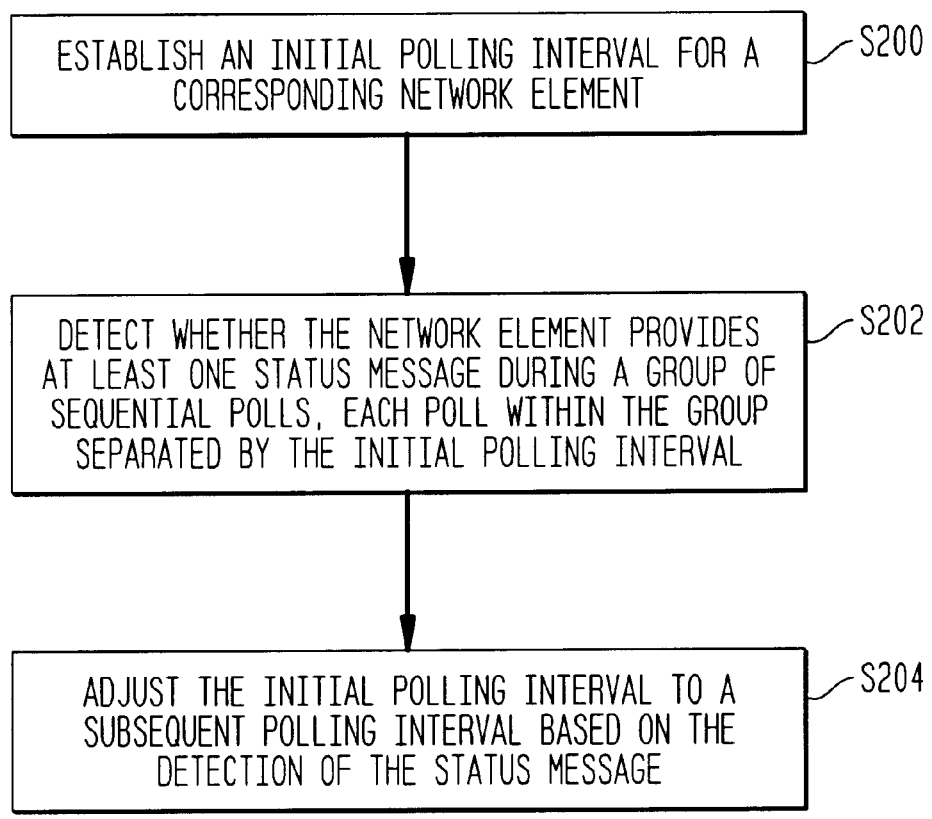
FIG. 5 is flow chart of a method for managing a communications network by adaptively adjusting a polling interval in accordance with the invention.

FIG. 5 shows a flow diagram of a method for managing a communications network to promote efficiency of communications resources between the network elements 20 and the network management system 10. In particular, FIG. 5 illustrates how the central control unit 12 controls the polling unit 16 in a dynamic manner to adapt the polling interval to the traffic provided by the network elements 20.

Starting in step S200, the central control unit 12 instructs the polling unit 16 to establish an initial polling interval for a corresponding network element 20.

In step S202, the detector 17 or the polling unit 16 detects whether the network element 20 provides at least one status message during a group of sequential polls. Each poll within the group is preferably separated by the initial polling interval, as opposed to a variable polling interval.

In step S204, the central control unit 12 instructs the polling unit 16 to adjust the initial polling interval to a subsequent polling interval based on the detection of the at least one status message. For example, the central control unit 12 adjusts the polling interval by adjusting the time duration of the poller timer associated with a corresponding network element 20.

The changes in the initial polling interval to the subsequent polling interval may be expressed in terms of a shift in polling frequency. Further, the polling unit 16 may decide to increase the polling frequency independently of the central control unit 12. The polling unit 16 may increase a first polling frequency associated with an initial polling interval to a second polling frequency associated with a subsequent polling interval, less than the initial polling interval, in response to continuous traffic detected from at least one network element 20. The polling unit 16 may decrease a first polling frequency associated with an initial polling interval to a second polling frequency associated with a subsequent polling interval, greater than the initial polling interval in response, to the continuous absence of traffic from at least one network element 20.

Figure 6A:
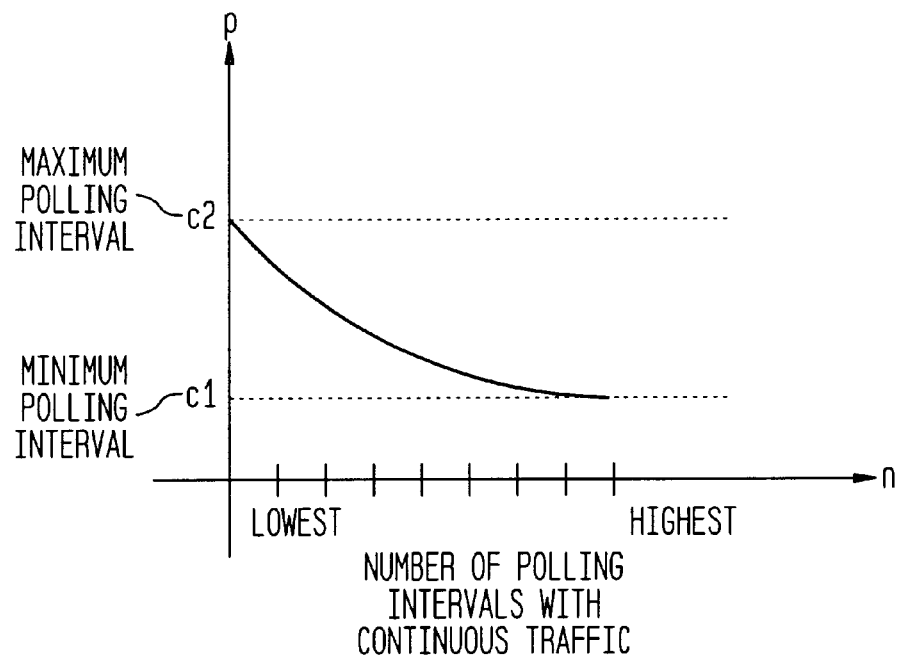
FIG. 6A is a graph that illustrates decreasing a polling interval within limits in response to continuous traffic at a network element in accordance with the invention.
Figure 6B:
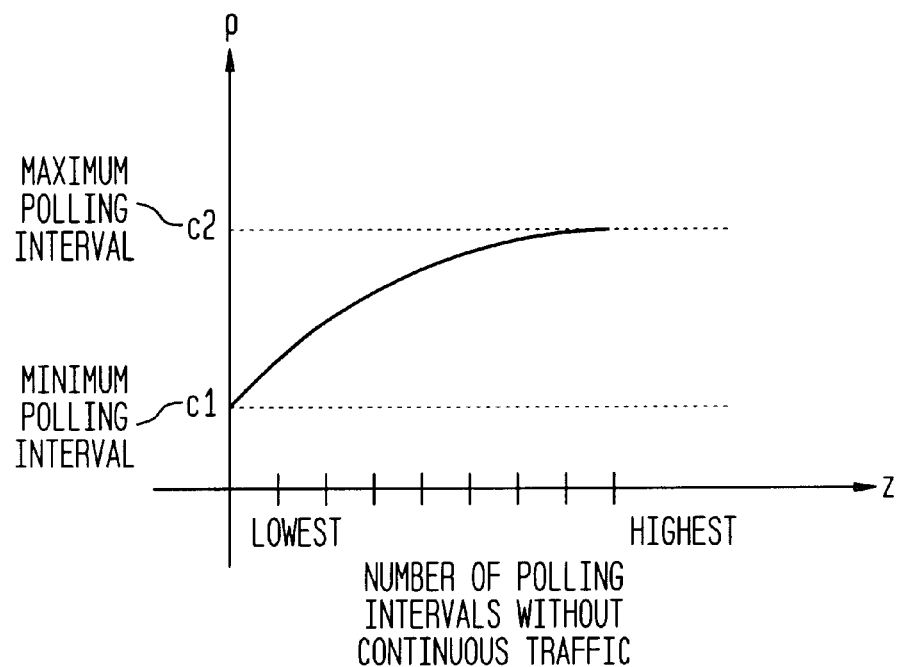
FIG. 6B is a graph that illustrates increasing a polling interval within limits in response to the absence of continuous traffic at a network element in accordance with the invention.

FIG. 6A and FIG. 6B are graphs that illustrate the adjustment of the initial interval to a subsequent interval in accordance with step S204 of FIG. 5. The vertical axis of FIG. 6A and FIG. 6B represents a polling interval that extends from a minimum polling interval C1 to an maximum polling interval C2. The minimum polling interval C1 corresponds to the highest polling frequency, whereas the maximum polling interval corresponds to the lowest polling frequency.

The horizontal axis of FIG. 6A represents N, the number of consecutive polling intervals with continuous traffic detected from the network elements 20 by the detector 17. The horizontal axis of FIG. 6B represents Z, the number of consecutive polling intervals with continuously absent traffic from a network element. The curves of FIG. 6A and FIG.

6B illustrate a logarithmic relationship between the polling interval and the number of polling intervals detected with continuously present traffic or continuously absent traffic, respectively.

FIG. 6A illustrates the graphical relationship that the central control unit 12 may apply after detection of continuous or sufficiently frequent traffic from a network element 20 or a group of network elements 20. Sufficiently frequent traffic refers to when a network element 20 provides a regularly occurring alarm or a periodically occurring alarm that occurs with sufficient frequency or probability to justify a given polling interval, such as the initial polling interval. If a network element 20 sends an alarm to the network management system 10 during each polling interval, the traffic from the network element 20 is regarded as entirely continuous traffic.

However, if a network element 20 does not send an alarm or status message exists over a group of polling intervals or some given time period, the traffic from the network element 20 is regarded as continuously absent. For continuously absent traffic, the network management system 10 decreases the polling interval as shown in FIG. 6B. The polling unit 16, the central control unit 12, or both decides whether to decrease or increase the polling interval.

The polling unit 16 may decrease the initial polling interval to the subsequent polling interval on a logarithmic scale if a fault message is continuously detected within the group of total executed polls associated with the initial polling interval. For example, as graphically illustrated in FIG. 6A, the polling unit 16 may decrease the initial polling interval to the subsequent polling interval according to the following equation: $p(n)=(c2-c1)/2^n+c1$, wherein n is the number of sequential polls of the group with continuously detected traffic from the network element 20, p is the subsequent polling interval, c1 is the minimum polling interval, and c2 is the maximum polling interval.

Instead of the above equation for decreasing the polling interval in the continuous presence of traffic, the following set of equations may be used as an alternative: $p(0)=c2$ and $p(n)=p(n-1)+(c2-c1)/2^n$, where $p(n-1)$ is known. The chart FIG. 6A may be stored in the polling unit 16 as a look-up table or as one or more of the foregoing mathematical equations as described herein.

The polling unit 16 may logarithmically increase the initial polling interval to the subsequent polling interval if the status message is not detected during at least one poll within the group associated with the initial polling interval. For example, as graphically illustrated in FIG. 6B, the central control unit 12 may increase the initial polling interval to the subsequent polling interval according to the following equation: $p(z)=c2-(c2-c1)/2^z$, wherein z is the number of sequential polls of the group with continuously absent traffic from a particular network element 20, p is the polling interval; c1 is the minimum polling interval, and c2 is the maximum polling interval.

Instead of the above equation for increasing the polling interval in the continuous absence of traffic, the following set of equations may be used as an alternative: $p(0)=c1$ and $p(z)=p(z-1)+(c2-c1)/2^z$, where $p(z-1)$ is known. The chart FIG. 6B may be stored in the polling unit 16 as a look-up table or as one or more of the foregoing mathematical equations as described herein.

The configuration data may include the maximum polling rate C1 and the minimum polling interval C2. Accordingly, the maximum polling interval C2 and the minimum polling rate C1 may be selected by the user within certain upper and lower absolute limits. The network management system 10 may not permit a user to enter a maximum polling interval C2 or a minimum polling interval C1, that exceed the upper or the lower absolute limits. Accordingly, if a user enters or requests a minimum or maximum polling interval that falls outside of the range defined between the upper and lower constraint, the central control unit 12 or polling unit 16 selects the closest valid value to the entry within the valid range between the upper and lower absolute limits.

The adaptive polling method and system is well-suited for improving the efficiency of use of telecommunication lines in a telecommunications network, or a wireless network associated with a network management system 10. Without sacrificing communications reliability, the network management system facilitates reducing unnecessary time-metered communications charges associated with at least one communications line between the network elements and the network management system. For example, the method and system facilitates the use of a minimum number of communication lines for monitoring a maximum number of network elements 20. Thus, a ratio of the minimum number of lines to the maximum number of network elements 20 monitored by the communication lines is lowered, where the minimum number of communication lines is in the numerator and the maximum number of elements is in the denominator.

In sum, the method and system of the present invention may be used to reduce the excess unneeded communications channels or traffic capacity between network elements 20 and a network management system 10 by dynamically allocating appropriate polling intervals commensurate with communications traffic produced by network elements 20. The network management system 10 may adjust the polling intervals on a group basis so that all network elements 20 of a polling group, associated with a common input/output port 13 have a common polling interval or such that each network element 20 has an associated polling interval that may be different from those of other network elements 20.

This specification describes various illustrative embodiments of the method and system of the present invention. The scope of the claims are intended to cover various modifications and equivalent arrangements of the illustrative embodiments disclosed in the specification. Therefore, the following claims should be accorded the reasonably broadest interpretations to cover modifications, equivalent structures, and features which are consistent with the spirit and scope of the invention disclosed herein.

What is claimed is:

1. A method for managing a communications network, the method comprising the steps of:
   establishing an initial polling interval for a corresponding network element;
   detecting whether the network element provides at least one status message during a group of sequential polls, each poll within the group separated by the initial polling interval; and
   adjusting the initial polling interval to a subsequent polling interval based on the detection of the at least one status message and a number of sequential polls of a group with one of continuously absent traffic from a particular network element and continuously detected traffic from the particular network element.

2. The method according to claim 1 wherein the adjusting step comprises logarithmically increasing the initial polling interval to the subsequent polling interval if the status message is not detected during at least one poll within the group associated with the initial polling interval.

3. The method according to claim 1 wherein the adjusting step comprises increasing the initial polling interval to the subsequent polling interval on a logarithmic scale if a fault message is not detected for at least one poll within the group associated with the initial polling interval.

4. The method according to claim 1 wherein the adjusting step comprises increasing the polling interval to the subsequent polling interval on a logarithmic scale ranging from a lower bound to an upper bound polling interval.

5. The method according to claim 1 wherein the adjusting step comprises increasing a first polling frequency associated with an initial polling interval to a second polling frequency associated with a subsequent polling interval, less than the initial polling interval, in response to continuous traffic detected from at least one network element.

6. The method according to claim 1 wherein the adjusting step comprises decreasing a first polling frequency associated with an initial polling interval to a second polling frequency associated with a subsequent polling interval, greater than the initial polling interval in response, to continuous traffic detected from at least one network element.

7. The method according to claim 1 wherein the adjusting step comprises decreasing the initial polling interval to the subsequent polling interval according to the following equation: $p(n)=(c2-c1)/2^n+c1$, wherein n is the number of sequential polls of the group with continuously detected traffic from the network element, p is the subsequent polling interval, c1 is the minimum polling interval, and c2 is the maximum polling interval.

8. The method according to claim 1 wherein the adjusting step comprises increasing the initial polling interval to the subsequent polling interval according to the following equation: $p(z)=c2-(c2-c1)/2^z$, wherein z is the number of sequential polls of the group with continuously absent traffic from a particular network element, p is the polling interval, c1 is the minimum polling interval, and c2 is the maximum polling interval.

9. The method according to claim 1 wherein the adjusting step comprises decreasing the polling interval to the subsequent polling interval on a logarithmic scale ranging from a lower bound to an upper bound polling interval.

10. A system for managing a communications network, the system comprising:

a central control unit for establishing an initial polling interval for a corresponding network element;

a detector for detecting whether the network element provides at least one status message during a group of sequential polls, each poll within the group separated by the initial polling interval; and a polling unit for adjusting the initial polling interval to a subsequent polling interval based on the detection of the at least one status message and a number of sequential polls of a group with one of continuously absent traffic from a particular network element and continuously detected traffic from the particular network element.

11. The system according to claim 10 wherein the polling unit logarithmically increases the initial polling interval to the subsequent polling interval if the status message is not detected during at least one poll within the group associated with the initial polling interval.

12. The system according to claim 10 wherein the polling unit increases the initial polling interval to the subsequent polling interval on a logarithmic scale if a fault message is not detected for at least one poll within the group associated with the initial polling interval.

13. The system according to claim 10 wherein the polling unit increases a first polling frequency associated with an initial polling interval to a second polling frequency associated with a subsequent polling interval, less than the initial polling interval, in response to continuous traffic detected by the detector from the network element.

14. The system according to claim 10 wherein the polling unit decreases a first polling frequency associated with an initial polling interval to a second polling frequency associated with a subsequent polling interval, greater than the initial polling interval in response, to continuous traffic detected by the detector from the network element.

15. The system according to claim 10 wherein the polling unit decreases the initial polling interval to the subsequent polling interval according to the following equation: $p(n)=(c2-c1)/2^n+c1$, wherein n is the number of sequential polls of the group with continuously detected traffic from the network element, p is the subsequent polling interval, c1 is the minimum polling interval, and c2 is the maximum polling interval.

16. The system according to claim 10 wherein the polling unit increases the initial polling interval to the subsequent polling interval according to the following equation: $p(z)=c2-(c2-c1)/2^z$, wherein z is the number of sequential polls of the group with continuously absent traffic from a particular network element, p is the polling interval, c1 is the minimum polling interval, and c2 is the maximum polling interval.

* * * * *